*(12)* United States Patent
Whitehead et al.

(10) Patent No.: US 6,885,496 B2
(45) Date of Patent: Apr. 26, 2005

(54) WIDE VIEWING ANGLE REFLECTIVE DISPLAY

(75) Inventors: Lorne A. Whitehead, Vancouver (CA); Michele Ann Mossman, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 10/671,570

(22) Filed: Sep. 29, 2003

(65) Prior Publication Data

US 2004/0174584 A1 Sep. 9, 2004

Related U.S. Application Data

(62) Division of application No. 10/086,349, filed on Mar. 4, 2002.

(51) Int. Cl.$^7$ .......................... G02B 26/00; G02B 26/08
(52) U.S. Cl. ....................... 359/296; 359/222
(58) Field of Search ................... 359/296, 291, 359/222, 263, 620, 253, 252; 345/84; 348/759; 349/62

(56) References Cited

U.S. PATENT DOCUMENTS

| | | |
|---|---|---|
| 3,291,554 A | 12/1966 | Price |
| 3,556,638 A | 1/1971 | Banks et al. |
| 3,571,511 A | 3/1971 | Myer |
| 3,612,653 A | 10/1971 | Rajchman |
| 3,698,793 A | * 10/1972 | Tellerman .................. 359/290 |
| 3,730,608 A | 5/1973 | Castegnier |
| 3,746,785 A | 7/1973 | Goodrich |
| 3,796,480 A | 3/1974 | Preston, Jr. et al. |
| 3,987,668 A | 10/1976 | Popenoe |
| 4,113,360 A | 9/1978 | Baur et al. |
| 4,135,960 A | 1/1979 | Shuppert et al. |
| 4,148,563 A | 4/1979 | Herbert |
| 4,156,745 A | 5/1979 | Hatzakis et al. |
| 4,165,155 A | 8/1979 | Gordon, II et al. |

(Continued)

FOREIGN PATENT DOCUMENTS

| | | |
|---|---|---|
| DE | 3720861 A | 3/1989 |
| DE | 4343808 A1 | 6/1995 |
| EP | 0023741 A1 | 2/1981 |

(Continued)

OTHER PUBLICATIONS

Dalisa, A., "Electrophoretic Display Technology," IEEE Transactions on Electron Devices, vol. 24, 827–834, 1977.
Mürau et al, "The understanding and elimination of some suspension instabilities in an electrophoretic display," J. Appl. Phys., vol. 49, No. 9, Sep. 1978, pp. 4820–4829.
"Subdivided Electrophoretic Display", Harbour et al, Xerox Disclosure Journal, vol. 4, No. 6, Nov. 1979, p. 705.

(Continued)

*Primary Examiner*—Georgia Epps
*Assistant Examiner*—Richard Hanig
(74) *Attorney, Agent, or Firm*—Oyen Wiggs Green & Mutala

(57) ABSTRACT

A reflective display having a plurality of approximately hemispherical high refractive index ($\eta_1$) transparent hemi-beads substantially covering and protruding inwardly from a transparent sheet's inward surface. The transparent sheet, which has an outward viewing surface, has a refractive index ($\eta_2$) which can be low (i.e. $\eta_1 \approx 1.92$ and $\eta_2 \approx 1.59$). A member is selectably moved into an intense evanescent wave region at the hemi-beads' inward side to selectably frustrate substantial total internal reflection of light rays. The member can be a plurality of light scattering particles suspended in a low refractive index ($\eta_3 \approx 1.27$) electrophoresis medium and electrophoretically moved into or out of the intense evanescent wave region.

9 Claims, 7 Drawing Sheets

U.S. PATENT DOCUMENTS

| | | | |
|---|---|---|---|
| 4,218,302 A | 8/1980 | Dalisa et al. | |
| 4,249,814 A | 2/1981 | Hull et al. | |
| 4,324,456 A | 4/1982 | Dalisa | |
| 4,391,490 A | 7/1983 | Hartke | |
| 4,420,897 A | 12/1983 | Castleberry | |
| 4,448,622 A | 5/1984 | Duchane et al. | |
| 4,536,061 A | 8/1985 | Nishimura | |
| 4,617,608 A | 10/1986 | Blonder et al. | |
| 4,714,326 A | 12/1987 | Usui et al. | |
| 4,723,834 A | 2/1988 | Van de Venne et al. | |
| 4,867,515 A | 9/1989 | Normandin | |
| 4,895,428 A | 1/1990 | Nelson et al. | |
| 5,045,847 A | 9/1991 | Tarui et al. | |
| 5,099,343 A | 3/1992 | Margerum et al. | |
| 5,128,782 A | 7/1992 | Wood | |
| 5,147,519 A | 9/1992 | Legge | |
| 5,221,987 A | 6/1993 | Laughlin | |
| 5,235,463 A | 8/1993 | Broussoux et al. | |
| 5,283,148 A | 2/1994 | Rao | |
| 5,301,009 A | 4/1994 | Shurtz, II | |
| 5,317,667 A | 5/1994 | Weber et al. | |
| 5,319,491 A | 6/1994 | Selbrede | |
| 5,396,350 A | 3/1995 | Beeson et al. | |
| 5,397,669 A | 3/1995 | Rao | |
| 5,425,710 A | 6/1995 | Khair et al. | |
| 5,455,709 A | 10/1995 | Dula, III et al. | |
| 5,504,618 A | 4/1996 | Hirs et al. | |
| 5,530,053 A | 6/1996 | Rao et al. | |
| 5,530,067 A | 6/1996 | Rao et al. | |
| 5,555,327 A | 9/1996 | Laughlin | |
| 5,555,558 A | 9/1996 | Laughlin | |
| 5,561,541 A | 10/1996 | Sharp et al. | |
| 5,566,260 A | 10/1996 | Laughlin | |
| 5,598,280 A | 1/1997 | Nishio et al. | |
| 5,608,837 A | 3/1997 | Tai et al. | |
| 5,731,900 A | 3/1998 | Milner | |
| 5,745,632 A | 4/1998 | Dreyer | |
| 5,841,916 A | 11/1998 | Laughlin | |
| 5,880,886 A | 3/1999 | Milner | |
| 5,959,777 A | 9/1999 | Whitehead | |
| 5,999,307 A | 12/1999 | Whitehead | |
| 6,064,784 A | 5/2000 | Whitehead et al. | |
| 6,088,013 A | 7/2000 | Montour et al. | |
| 6,215,920 B1 * | 4/2001 | Whitehead et al. | 385/18 |
| 6,304,365 B1 * | 10/2001 | Whitehead | 359/296 |

FOREIGN PATENT DOCUMENTS

| | | |
|---|---|---|
| EP | 204427 A | 12/1986 |
| EP | 728799 A1 | 8/1996 |
| EP | 797127 A | 9/1997 |
| EP | 0807832 A2 | 11/1997 |
| GB | 2265024 A | 9/1993 |
| JP | 54057576 | 5/1979 |
| JP | 55-525 | 1/1980 |
| JP | 59078816 | 5/1984 |
| JP | 60038130 | 2/1985 |
| JP | 60-185918 | 9/1985 |
| JP | 2-254405 | 10/1990 |
| JP | 5-281481 | 10/1993 |
| WO | WO 95/31738 | 11/1995 |
| WO | WO 97/31276 | 8/1997 |
| WO | WO 99/12069 | 3/1999 |
| WO | WO 99/15595 | 4/1999 |
| WO | WO 99/28890 | 6/1999 |
| WO | WO 00/17477 | 3/2000 |
| WO | WO 01/37627 | 5/2001 |

OTHER PUBLICATIONS

"Simplified Ray Tracing in Cylindrical Systems", L.A. Whitehead, Applied Optics, vol. 21, No. 19, pp. 3536–3538, Oct., 1, 1982.

"Surface Property Changes Induced In Poly(1–Hexene) Elastomer By High Energy Ion Irradition", Carlson et al, Proc. 4th Intl. Conf. on Ion Bean Modification of Materials, Ithaca, NY, Jul. 16–20, 1984 pp. 507–512.

"Evanescent–wave scattering by electrophoretic microparticles: a mechanism for optical switching", Remillard et al, Applied Optics, vol. 34, No. 19, Jul., 1, 1995, pp. 3777–3785.

"Patented fiber switch revs speed, cuts cost", George Kotelly, in "Lightwave" Oct., 1995 web site publication of PennWell Publishing Co., Tulsa, OK.

"Colloidal Refractometry: Meaning and Measurement of Refractive Index for Dispersions; The Science That Time Forgot", M. Mohammadi, Advances in Colloid and Interface Science 62 (1995) 17–29.

"Elastomeric Light Valves", Qin et al, Advanced Materials 1997, 9, No. 5, pp. 407–410.

3M Fluorinert™ Electronic Liquid brochure, http://www.3m.com/fluids/florinrt.html, Sep., 1998.

Neufeldt, Victoria. Webster's New World Dictionary of American English, 3rd College Edition. Webster's New World, New York, New York, p. 857. Dec. 31, 1998.

Drzaic, P., et al, "A Printed and Rollable Bistable Electronic Display," Society for Information Display Symposium Proceedings, 1131–1134, 1998.

Nakamura, E. et al, "Development of Electrophoretic Display Using Microencapsulated Suspension," Society for Information Display Symposium Proceedings, 1014–1017, 1998.

"New Refractive Display Based on Total Internal Reflection In Prismatic Microstructures", Michele A. Mossman et al, Intl. Display Research Conference of the Society for Information Display, Sep., 2000.

"Krytox 157 FS Fluorinated Oil," 2000 brochure of E.I. du Pont de Nemours and Company.

Kambe et al, in "Refractive Index Engineering of Nano–Polymer Composites", Materials Research Society Conference, San Francisco, Apr. 16–20, 2001.

Mossman, M.A. et al, "New Reflective Display Technique Based on Total Internal Reflection and Subtractive Colour Filtering," Society for Information Display Symposium Proceedings, 1054–1057, 2001.

* cited by examiner

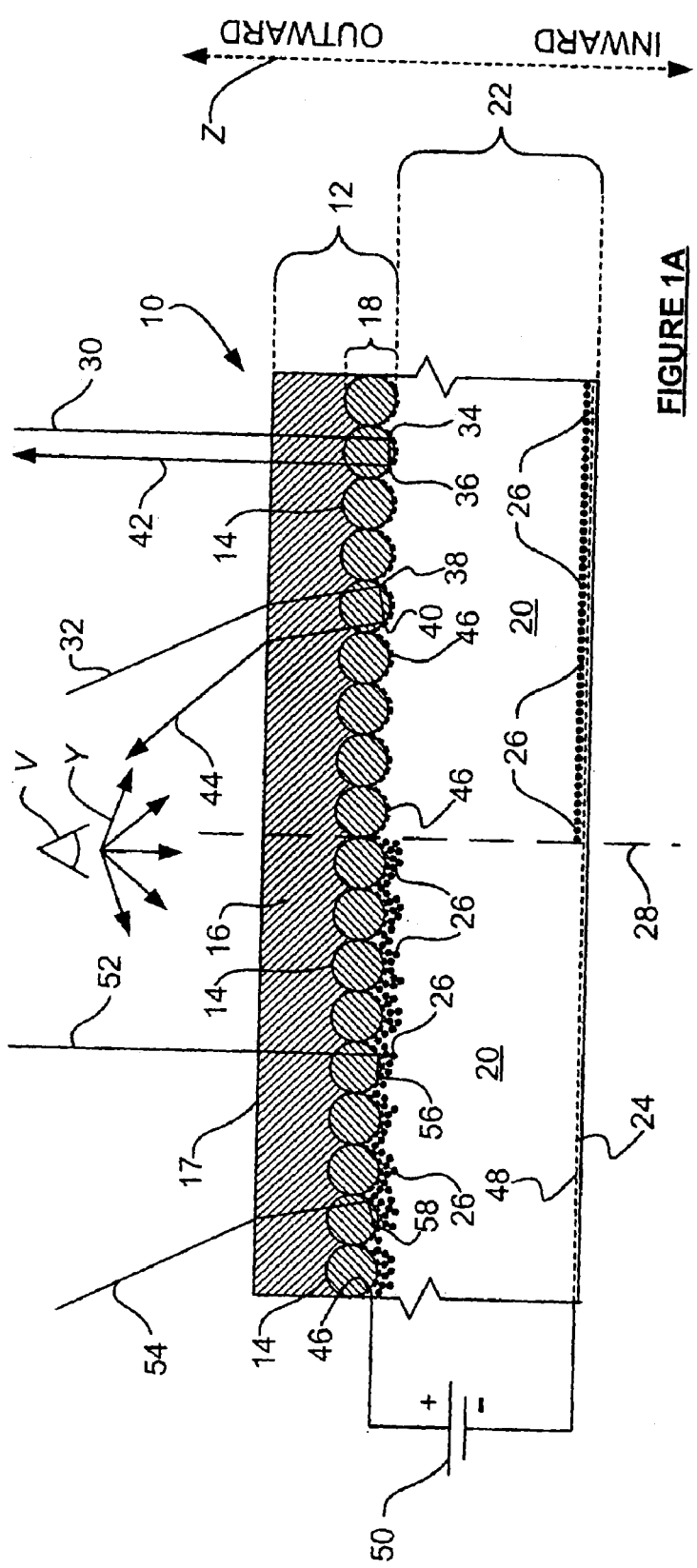
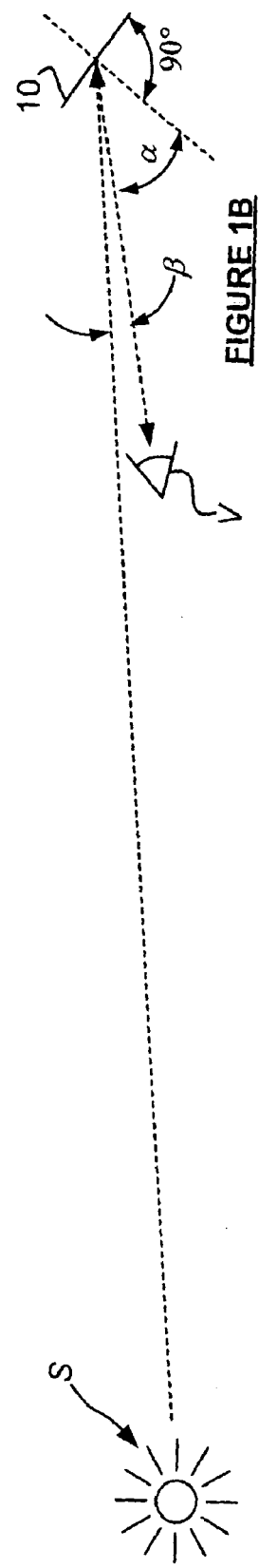
FIGURE 1A
FIGURE 1B

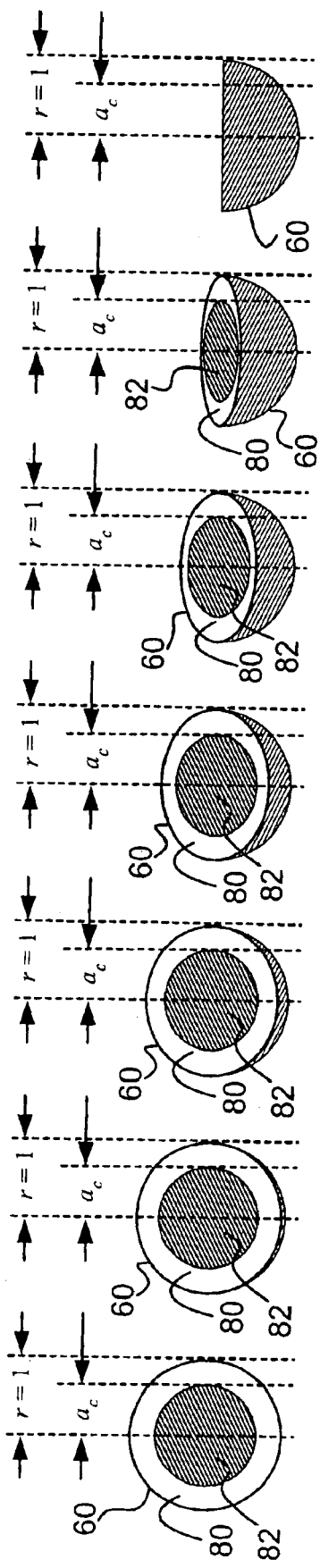
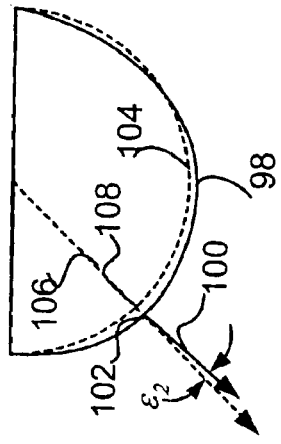
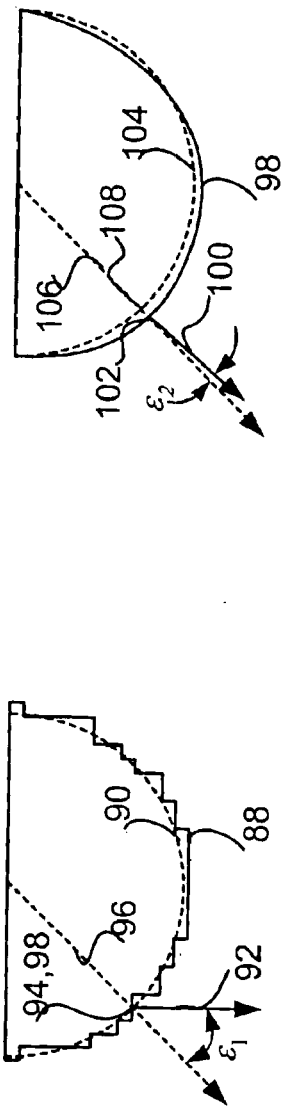

US 6,885,496 B2

WIDE VIEWING ANGLE REFLECTIVE DISPLAY

REFERENCE TO RELATED APPLICATION

This is a division of U.S. patent application Ser. No. 10/086,349 filed 4 Mar. 2002.

TECHNICAL FIELD

This invention improves the angular viewing range of reflective displays.

BACKGROUND

Images can be displayed by controllably frustrating total internal reflection (TIR) to switch selected pixels of a multi-pixel display between a reflective state in which light incident on those pixels undergoes TIR, and a non-reflective state in which TIR is frustrated at those pixels. As one example, electrophoresis can be used to controllably frustrate TIR and selectably switch pixels' states in such displays. Electrophoresis is a well known phenomenon whereby an applied electric field moves charged particles, ions or molecules through a medium. An electromagnetic force can be selectively applied to move particles through an electrophoretic medium toward or away from an evanescent wave region to frustrate TIR at selected pixels. This invention increases the range of practical viewing angles for images displayed by frustrated TIR or other reflective display methods.

BRIEF DESCRIPTION OF DRAWINGS

FIG. 1A is a fragmented cross-sectional view, on a greatly enlarged scale, of a portion of an electrophoretically frustrated TIR display in accordance with one embodiment of the invention.

FIG. 1B schematically illustrates the wide angle viewing range α of the FIG. 1A apparatus, and the angular range β of the illumination source.

FIGS. 4A, 4B, 4C, 4D, 4E, 4F and 4G depict the FIG. 2 hemispherical structure, as seen from viewing angles which are offset 0°, 15°, 30°, 45°, 60°, 75° and 90° respectively from the perpendicular.

FIGS. 7A and 7B are cross-sectional views, on a greatly enlarged scale, of structures which respectively are not (FIG. 7A) and are (FIG. 7B) approximately hemispherical.

DESCRIPTION

Figure 2:
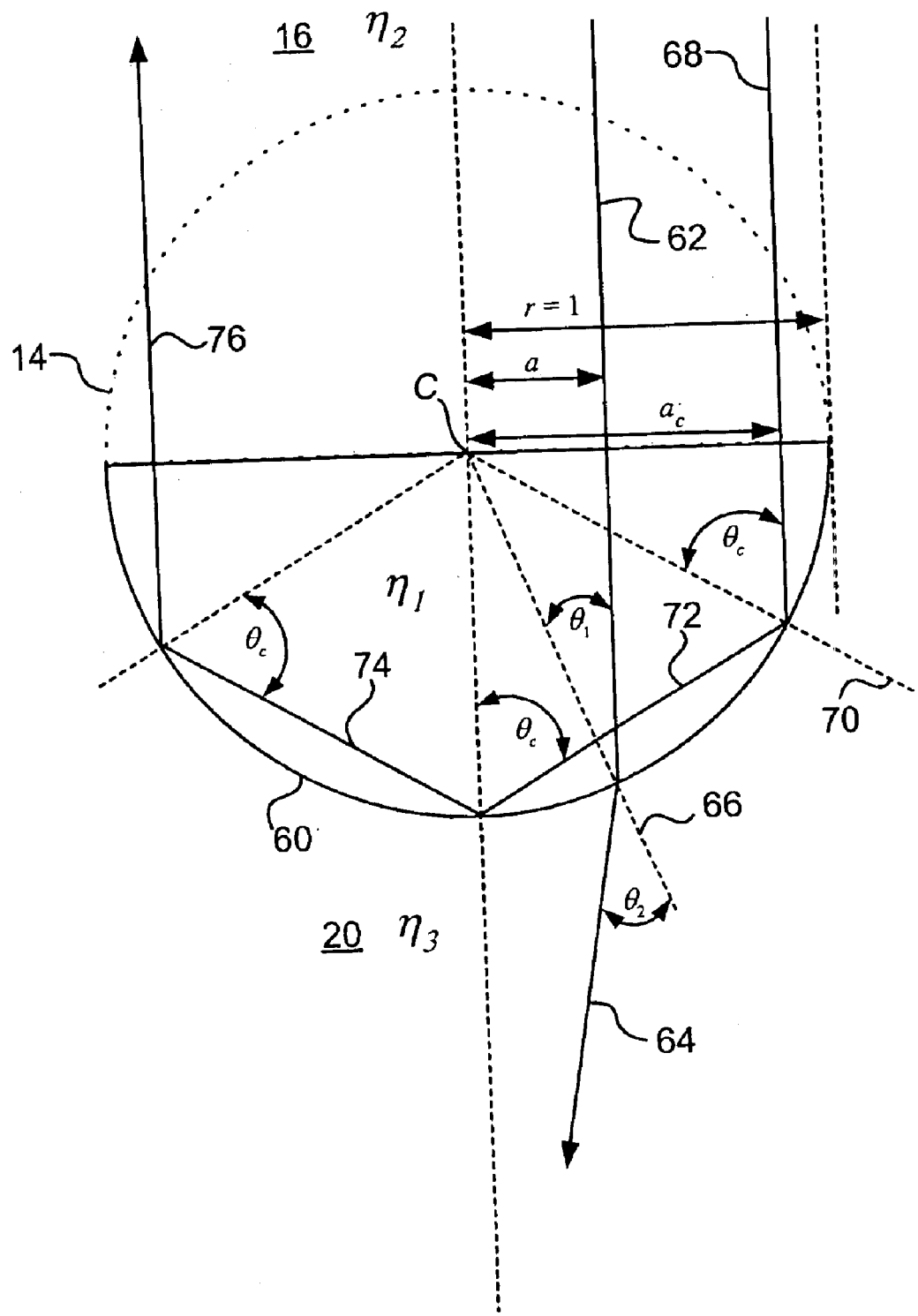
FIG. 2 is a cross-sectional view, on a greatly enlarged scale, of a hemispherical portion of one of the spherical high refractive index beads of the FIG. 1A apparatus.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

FIG. 1A depicts a portion of a front-lit electrophoretically frustrated TIR display 10 having a transparent outward sheet 12 formed by partially embedding a large plurality of high refractive index ($\eta_1$) transparent beads 14 in the inward surface of a high refractive index ($\eta_2$) polymeric material 16 having a flat outward viewing surface 17 which viewer V observes through an angular range of viewing directions Y. The "inward" and "outward" directions are indicated by double-headed arrow Z. Beads 14 are packed closely together to form an inwardly projecting monolayer 18 having a thickness approximately equal to the diameter of one of beads 14. Ideally, each one of beads 14 touches all of the beads immediately adjacent to that one bead. As explained below, minimal gaps (ideally, no gaps) remain between adjacent beads. Beads 14 may for example be 40–100 micron diameter high index glass beads available from Potters Industries Inc., Valley Forge, Pa., under the product classification T-4 Sign Beads. Such beads have a refractive index $\eta_1$ of approximately 1.90–1.92. Material 14 may be a nano-polymer composite, for example high refractive index particles suspended in a polymer as described by Kambe et al, in "Refractive Index Engineering of Nano-Polymer Composites", Materials Research Society Conference, San Francisco, Apr. 16–20, 2001 having a comparably high index $\eta_2$ (i.e. $\eta_2$ is greater than about 1.75).

An electrophoresis medium 20 is maintained adjacent the portions of beads 14 which protrude inwardly from material 16 by containment of medium 20 within a reservoir 22 defined by lower sheet 24. An inert, low refractive index (i.e. less than about 1.35), low viscosity, electrically insulating liquid such as Fluorinert™ perfluorinated hydrocarbon liquid ($\eta_3$~1.27) available from 3M, St. Paul, Minn. is a suitable electrophoresis medium. A bead:liquid TIR interface is thus formed. Medium 20 contains a finely dispersed suspension of light scattering and/or absorptive particles 26 such as pigments, dyed or otherwise scattering/absorptive silica or latex particles, etc. Sheet 24's optical characteristics are relatively unimportant: sheet 24 need only form a reservoir for containment of electrophoresis medium 20 and particles 26, and serve as a support for electrode 48 as described below.

A small critical angle is preferred at the TIR interface since this affords a large range of angles over which TIR may occur. The relatively large ratio of the index of refraction of beads 14 ($\eta_1$~1.90–1.92) and material 16 ($\eta_2$~1.92) to that of Fluorinert ($\eta_3$~1.27) yields a critical angle of about 41.4°, which is quite small. In the absence of electrophoretic activity, as is illustrated to the right of dashed line 28 in FIG. 1A, a substantial fraction (which may be as little as 25%) of the light rays passing through sheet 12 and beads 14 undergoes TIR at the inward side of beads 14. For example, incident light rays 30, 32 are refracted through material 16 and beads 14. As described below, the rays undergo TIR two or more times at the bead:liquid TIR interface, as indicated at points 34, 36 in the case of ray 30; and indicated at points 38, 40 in the case of ray 32. The totally internally reflected rays are then refracted back through beads 14 and material 16 and emerge as rays 42, 44 respectively, achieving a "white" appearance in each reflection region or pixel.

As is well known, the TIR interface between two media having different refractive indices is characterized by a critical angle $\theta_c$. Light rays incident upon the interface at angles less than $\theta_c$ are transmitted through the interface. Light rays incident upon the interface at angles greater than $\theta_c$ undergo TIR at the interface. It is also well known that as the angle of an incident light ray approaches $\theta_c$, the ray is partially reflected by and partially transmitted through the TIR interface, with the reflected portion increasing and the transmitted portion decreasing as the incident angle increases. This invention does not require the incident light rays' angular relationship to exceed $\theta_c$ such that the rays undergo "full" TIR. It is sufficient, as is the case for any TIR-type reflective display, for the incident rays to undergo "substantial TIR" in the sense that a substantial fraction (which may be as little as about 80%) of the incident light is reflected even though the remaining fraction is not reflected; and, it is also sufficient, as is again the case for any TIR-type reflective display, to frustrate such "substantial TIR". Persons skilled in the art will accordingly understand that references herein to "TIR" and to "frustration of TIR" respectively mean "substantial TIR" and "frustration of "substantial TIR".

A voltage can be applied across medium 20 via electrodes 46, 48, which can for example be applied by vapour-deposition to the inwardly protruding surface portion of beads 14 and to the outward surface of sheet 24. Electrode 46 is transparent and substantially thin to minimize its interference with light rays at the bead:liquid TIR interface. Electrode 48 need not be transparent. If electrophoresis medium 20 is activated by actuating voltage source 50 to apply a voltage between electrodes 46, 48 as illustrated to the left of dashed line 28, suspended particles 26 are electrophoretically moved into the region where the evanescent wave is relatively intense (i.e. within 0.25 micron of the inward surfaces of inwardly protruding beads 14, or closer). When electrophoretically moved as aforesaid, particles 26 scatter or absorb light, by modifying the imaginary and possibly the real component of the effective refractive index at the bead:liquid TIR interface. This is illustrated by light rays 52, 54 which are scattered and/or absorbed as they strike particles 26 inside the evanescent wave region at the bead:liquid TIR interface, as indicated at 56, 58 respectively, thus achieving a "dark" appearance in each non-reflective absorption region or pixel.

As described above, the net optical characteristics of outward sheet 12 can be controlled by controlling the voltage applied across medium 20 via electrodes 46, 48. The electrodes can be segmented to control the electrophoretic activation of medium 20 across separate regions or pixels of sheet 12, thus forming an image.

Besides having the desired low refractive index, perfluorinated hydrocarbon liquids are also well suited to use in displays formed in accordance with the invention because they are good electrical insulators, and they are inert. Perfluorinated hydrocarbon liquids also have low viscosity and high density, so particles suspended in such liquids can be moved electrophoretically relatively easily.

Beads 14 and polymeric material 16 are preferably optically clear—meaning that a substantial fraction of light at normal incidence passes through a selected thickness of the bead or material, with only a small fraction of such light being scattered and/or absorbed by the bead or material. Diminished optical clarity is caused by such scattering and/or absorption, typically a combination of both, as the light passes through the bead or material. Sheet 12 need only have a thickness one-half that of beads 14 (i.e. 20 microns for the aforementioned 40 micron beads). A material which is "opaque" in bulk form may nevertheless be "optically clear" for purposes of the invention, if a 10 micron thickness of such material scatters and/or absorbs only a small fraction of normal incident light. Some high refractive index nano-composite polymers have this characteristic and are therefore well suited to use in displays formed in accordance with the invention.

Application of a voltage across medium 20 by means of electrodes 46, 48 and voltage source 50 applies electrostatic force on particles 26, causing them to move into the evanescent wave region as aforesaid. When particles 26 move into the evanescent wave region they must be capable of frustrating TIR at the bead:liquid interface, by scattering and/or absorbing the evanescent wave. Although particles 26 may be as large as one micron in diameter, the particles' diameter is preferably significantly sub-optical (i.e. smaller than about 0.25 microns for visible light) such that one or more monolayers of particles 26 at the TIR interface can entirely fill the evanescent wave region. Useful results are obtained if the diameter of particles 26 is about one micron, but the display's contrast ratio is reduced because the ability of particles 26 to pack closely together at the TIR interface is limited by their diameter. More particularly, near the critical angle, the evanescent wave extends quite far into medium 20, so particles having a diameter of about one micron are able to scatter and/or absorb the wave and thereby frustrate TIR. But, as the angle at which incident light rays strike the TIR interface increases relative to the critical angle, the depth of the evanescent wave region decreases significantly. Relatively large (i.e. one micron) diameter particles cannot be packed as closely into this reduced depth region and accordingly such particles are unable to frustrate TIR to the desired extent. Smaller diameter (i.e. 250 nm) particles can however be closely packed into this reduced depth region and accordingly such particles are able to frustrate TIR for incident light rays which strike the TIR interface at angles exceeding the critical angle.

It is difficult to mechanically frustrate TIR at a non-flat surface like that formed by the inwardly protruding portions of beads 14, due to the difficulty in attaining the required alignment accuracy between the non-flat surface and the part which is to be mechanically moved into and out of optical contact with the surface. However, electrophoretic medium 20 easily flows to surround the inwardly protruding portions of beads 14, thus eliminating the alignment difficulty and rendering practical the approximately hemispherically surfaced ("hemi-beaded") bead:liquid TIR interface described above and shown in FIG. 1A.

In the FIG. 1A embodiment, the refractive index of beads 14 is preferably identical to that of material 16. In such case, only the hemispherical (or approximately hemispherical) portions of beads 14 which protrude into medium 20 are optically significant. Consequently, beads 14 need not be discretely embedded within material 16. As explained below, hemispherical (or approximately hemispherical) beads may instead be affixed to a substrate to provide a composite sheet bearing a plurality of inwardly convex protrusions with no gaps, or minimal gaps, between adjacent protrusions and having sufficient approximate sphericity to achieve high apparent brightness through a wide angular viewing range.

It is convenient to explain the invention's wide viewing angle characteristic for the case in which the inwardly convex protrusions are hemispheres. FIG. 2 depicts, in enlarged cross-section, a hemispherical portion 60 of one of spherical beads 14. Hemisphere 60 has a normalized radius r=1 and a refractive index $\eta_1$. A light ray 62 perpendicularly incident (through material 16) on hemisphere 60 at a radial distance a from hemisphere 60's centre C encounters the inward surface of hemisphere 60 at an angle $\theta_1$ relative to radial axis 66. For purposes of this theoretically ideal discussion, it is assumed that material 16 has the same refractive index as hemisphere 60 (i.e. $\eta_1=\eta_2$), so ray 62 passes from material 16 into hemisphere 60 without refraction. Ray 62 is refracted at the inward surface of hemisphere 60 and passes into electrophoretic medium 20 as ray 64 at an angle $\theta_2$ relative to radial axis 66.

Now consider incident light ray 68 which is perpendicularly incident (through material 16) on hemisphere 60 at a distance $$a_c = \frac{\eta_3}{\eta_1}$$

from hemisphere 60's centre C. Ray 68 encounters the inward surface of hemisphere 60 at the critical angle $\theta_c$ (relative to radial axis 70), the minimum required angle for TIR to occur. Ray 68 is accordingly totally internally reflected, as ray 72, which again encounters the inward surface of hemisphere 60 at the critical angle $\theta_c$. Ray 72 is accordingly totally internally reflected, as ray 74, which also encounters the inward surface of hemisphere 60 at the critical angle $\theta_c$. Ray 74 is accordingly totally internally reflected, as ray 76, which passes perpendicularly through hemisphere 60 into the embedded portion of bead 14 and into material 16. Ray 68 is thus reflected back as ray 76 in a direction approximately opposite that of incident ray 68.

Figure 3C:
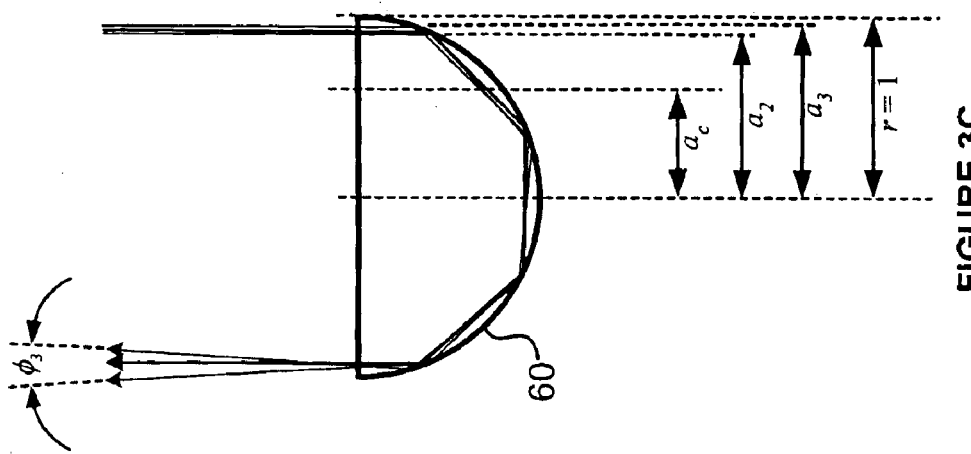
FIGS. 3A, 3B and 3C depict semi-retro-reflection of light rays perpendicularly incident on the FIG. 2 hemispherical structure at increasing off-axis distances at which the incident rays undergo TIR two, three and four times respectively.
Figure 3B:
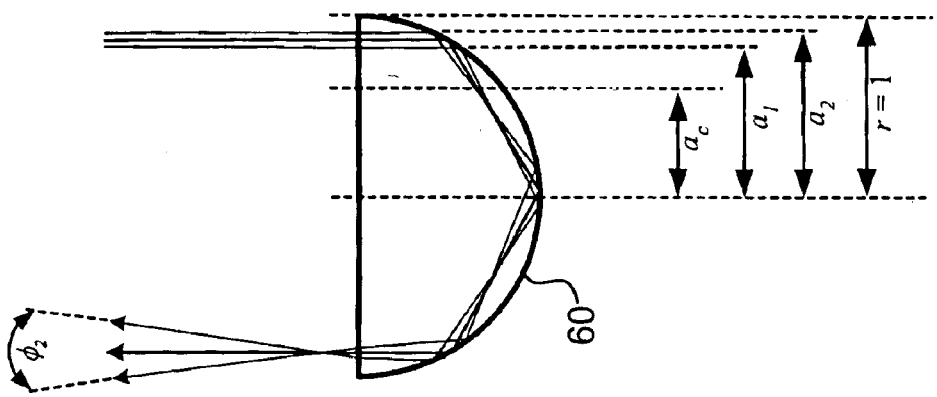
Figure 3A:
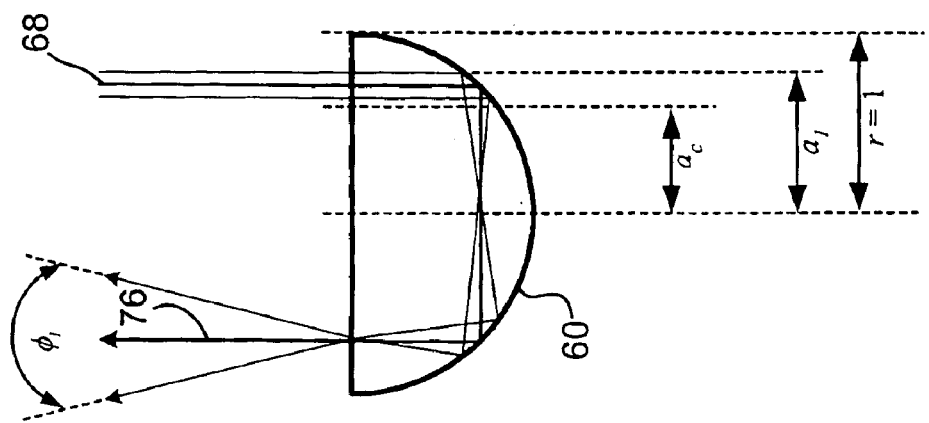

All light rays which are perpendicularly incident on hemisphere 60 at distances $a \geq a_c$ from hemisphere 60's centre C are reflected back, as described above for rays 68, 76; it being understood that FIG. 2 depicts a theoretically ideal but practically unattainable optically "perfect" hemisphere 60 which reflects ray 76 in a direction opposite that of incident ray 68. Returning to FIG. 1A, it can be seen that ray 30, which is reflected back as ray 42, is another example of such a ray. FIGS. 3A, 3B and 3C depict three of optically "perfect" hemisphere 60's reflection modes. These and other modes coexist, but it is useful to discuss each mode separately.

In FIG. 3A, light rays incident within a range of distances $a_c < a \leq a_1$ undergo TIR twice (the 2-TIR mode) and the reflected rays diverge within a comparatively wide arc $\phi_1$ centred on a direction opposite to the direction of the incident light rays. In FIG. 3B, light rays incident within a range of distances $a_1 < a \leq a_2$ undergo TIR three times (the 3-TIR mode) and the reflected rays diverge within a narrower arc $\phi_2 < \phi_1$ which is again centred on a direction opposite to the direction of the incident light rays. In FIG. 3C, light rays incident within a range of distances $a_2 < a \leq a_3$ undergo TIR four times (the 4-TIR mode) and the reflected rays diverge within a still narrower arc $\phi_3 < \phi_2$ also centred on a direction opposite to the direction of the incident light rays. Hemisphere 60 thus has a "semi-retro-reflective", partially diffuse reflection characteristic, causing display 10 to have a diffuse appearance akin to that of paper.

Display 10 also has a relatively high apparent brightness comparable to that of paper. At normal incidence, the reflectance R of hemisphere 60 (i.e. the fraction of light rays incident on hemisphere 60 that reflect by TIR) is given by $$R = 1 - \left(\frac{\eta_3}{\eta_1}\right)^2$$

where $\eta_1$ is the refractive index of hemisphere 60 and $\eta_3$ is the refractive index of the medium adjacent the surface of hemisphere 60 at which TIR occurs. Thus, if hemisphere 60 is formed of a lower refractive index material such as polycarbonate ($\eta_1 \sim 1.59$) and if the adjacent medium is Fluorinert ($\eta_3 \sim 1.27$), a reflectance R of about 36% is attained, whereas if hemisphere 60 is formed of a high refractive index nano-composite material ($\eta_1 \sim 1.92$) a reflectance R of about 56% is attained. When illumination source S (FIG. 1B) is positioned behind viewer V's head, the apparent brightness of display 10 is further enhanced by the aforementioned semi-retro-reflective characteristic, as explained below.

As shown in FIGS. 4A–4G, hemisphere 60's reflectance is maintained over a broad range of incidence angles, thus enhancing display 10's wide angular viewing characteristic and its apparent brightness. For example, FIG. 4A shows hemisphere 60 as seen from perpendicular incidence—that is, from an incidence angle offset 0° from the perpendicular. In this case, the portion 80 of hemisphere 60 for which $a \geq a_c$ appears as an annulus. The annulus is depicted as white, corresponding to the fact that this is the region of hemisphere 60 which reflects incident light rays by TIR, as aforesaid. The annulus surrounds a circular region 82 which is depicted as dark, corresponding to the fact that this is the non-reflective region of hemisphere 60 within which incident rays do not undergo TIR. FIGS. 4B–4G show hemisphere 60 as seen from incidence angles which are respectively offset 15°, 30°, 45°, 60°, 75° and 90° from the perpendicular. Comparison of FIGS. 4B–4G with FIG. 4A reveals that the observed area of reflective portion 80 of hemisphere 60 for which $a \geq a_c$, decreases only gradually as the incidence angle increases. Even at near glancing incidence angles (FIG. 4F) an observer will still see a substantial part of reflective portion 80, thus giving display 10 a wide angular viewing range over which high apparent brightness is maintained.

Figure 5B:
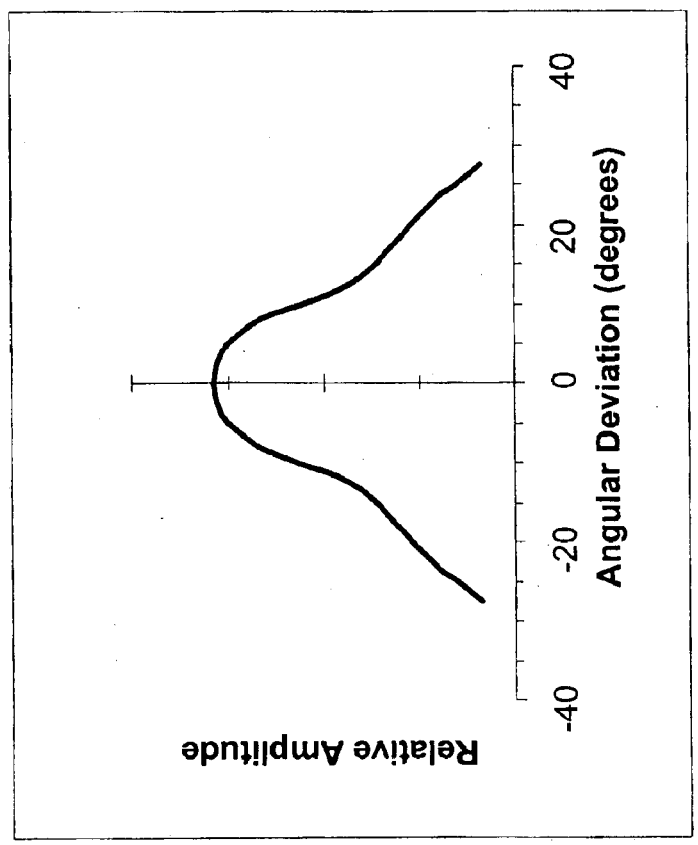
FIG. 5B graphically depicts the relative energy distribution, as a function of angular error, of light rays reflected by the FIG. 2 hemispherical structure.
Figure 5A:
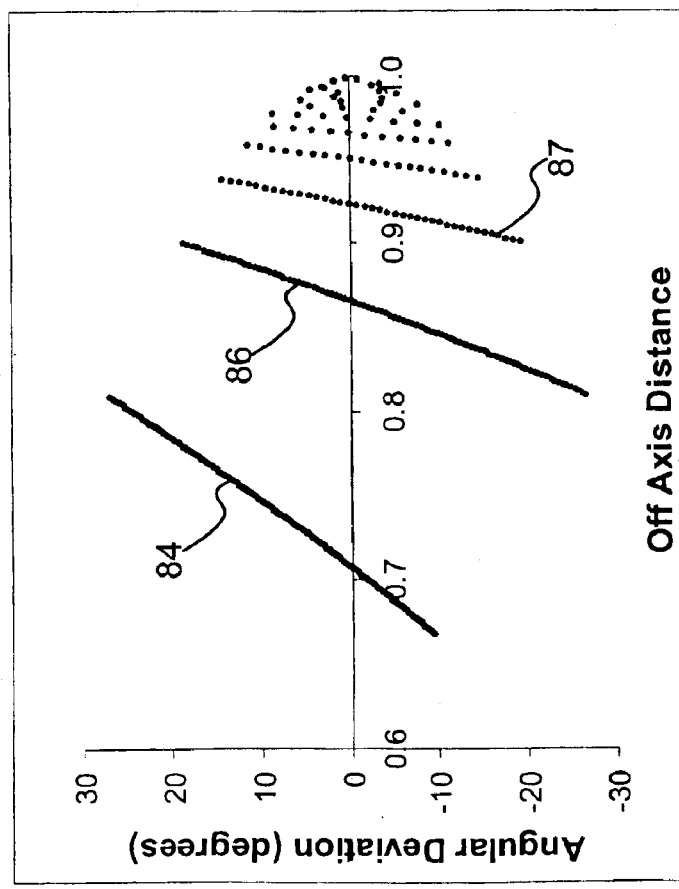
FIG. 5A graphically depicts the angular deviation from true retro-reflection of light rays reflected by the FIG. 2 hemispherical structure. Angular deviation is shown as a function of off-axis distance a normalized such that the radius r=1.

FIGS. 5A and 5B further describe the nature of display 10's semi-retro-reflective characteristic. "True retro-reflection" occurs when the reflected ray is returned in a direction opposite to that of the incident ray. For purposes of this invention, "semi-retro-reflection" occurs when the reflected ray is returned in a direction approximately opposite to that of the incident ray. Hemispherical reflectors are inherently semi-retro-reflective. In FIG. 5A, curve 84 represents the angular range of deviation from true retro-reflection of light rays reflected by hemisphere 60 after undergoing TIR twice (the FIG. 3A 2-TIR mode). As expected, the angular deviation is 0° at $$a = \frac{1}{\sqrt{2}} = .707 = \sin 45°.$$

That is, in the 2-TIR mode, true retro-reflection occurs if the incident ray encounters hemisphere 60's TIR interface at an angle of 45°. The angular deviation ranges from about −10° to about 27° as rays vary over the 2-TIR mode incident range for which they are reflected twice. Within this range, apart from the special case of true retro-reflection at 0° angular deviation, the rays are semi-retro-reflected.

FIG. 5A's curve 86 represents the angular range of deviation from true retro-reflection of light rays reflected by hemisphere 60 after undergoing TIR three times (the FIG. 3B 3-TIR mode). As expected, the angular deviation is 0° at $$a = \frac{\sqrt{3}}{2} = .866 = \sin 60°.$$

That is, in the 3-TIR mode, true retro-reflection occurs if the incident ray encounters hemisphere 60's TIR interface at an angle of 60°. The angular deviation ranges from about −27° to about 18° as rays vary over the 3-TIR mode incident range for which they are reflected three times. Within this range, apart from the special case of true retro-reflection at 0° angular deviation, the rays are semi-retro-reflected.

FIG. 5A's curve 87 represents the angular range of deviation from true retro-reflection of light rays which are reflected by hemisphere 60 after undergoing TIR four times (the FIG. 3C 4-TIR mode). The angular deviation is 0° at a=0.924=sin 67.5°. That is, in the 4-TIR mode, true retro-reflection occurs if the incident ray encounters hemisphere 60's TIR interface at an angle of 67.5°. The angular deviation ranges from about −20° to about 15° as rays vary over the 4-TIR mode incident range for which they are reflected four times. Within this range, apart from the special case of true retro-reflection at 0° angular deviation, the rays are semi-retro-reflected.

FIG. 5A also depicts curves representing the angular range of deviation from true retro-reflection of light rays which are reflected by hemisphere 60 after undergoing TIR five, six, seven or more times. Instead of considering these 5-TIR, 6-TIR, 7-TIR and higher modes, it is more useful to consider FIG. 5B, which shows the relative amount (amplitude) of light reflected by hemisphere 60 as a function of the aforementioned angular deviation. The total area beneath the curve plotted in FIG. 5B corresponds to the cumulative energy of light rays reflected by hemisphere 60 in all TIR modes.

Every curve plotted in FIG. 5A intersects the 0° angular deviation horizontal axis. Consequently, the cumulative amount of light reflected in all TIR modes reaches a maximum value at 0° angular deviation, as seen in FIG. 5B. The cumulative amount of light reflected in all TIR modes decreases as the magnitude of the aforementioned angular deviation increases, as is also shown in FIG. 5B. Very roughly, approximately one-half of the cumulative reflective energy of light rays reflected by hemisphere 60 lies within an angular deviation range up to about 10°; and, approximately one-third of the cumulative reflective energy lies within an angular deviation range up to about 5°. Consequently, display 10 has very high apparent brightness when the dominant source of illumination is behind the viewer, within a small angular range. This is further illustrated in FIG. 1B which depicts the wide angular range α over which viewer V is able to view display 10, and the angle β which is the angular deviation of illumination source S relative to the location of viewer V. Display's 10's high apparent brightness is maintained as long as β is not too large, with the fall-off occurring in proportion to the relative amplitude plotted in FIG. 5B.

Figure 6A:
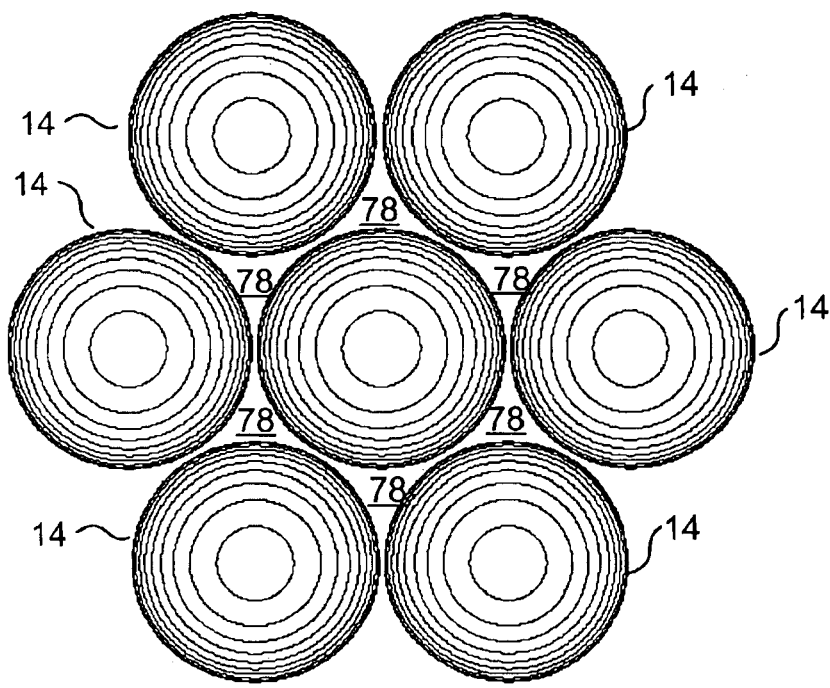
FIGS. 6A and 6B are topographic bottom plan views, on a greatly enlarged scale, of a plurality of hemispherical (FIG. 6A) and approximately hemispherical (FIG. 6B) hemibeads.

Although it may be convenient to fabricate display 10 using spherically (or hemispherically) shaped glass beads as aforesaid, a sphere (or hemisphere) may not be the best shape for beads 14 in all cases. This is because, as shown in FIG. 6A, even if spherical (or hemispherical) beads 14 are packed together as closely as possible within monolayer 18 (FIG. 1A), gaps 78 unavoidably remain between adjacent beads. Light rays incident upon any of gaps 78 are "lost", in the sense that they pass directly into electrophoretic medium 20, producing undesirable dark spots on viewing surface 17. While these spots are invisibly small, and therefore do not detract from display 10's appearance, they do detract from viewing surface 17's net average reflectance.

Figure 6B:
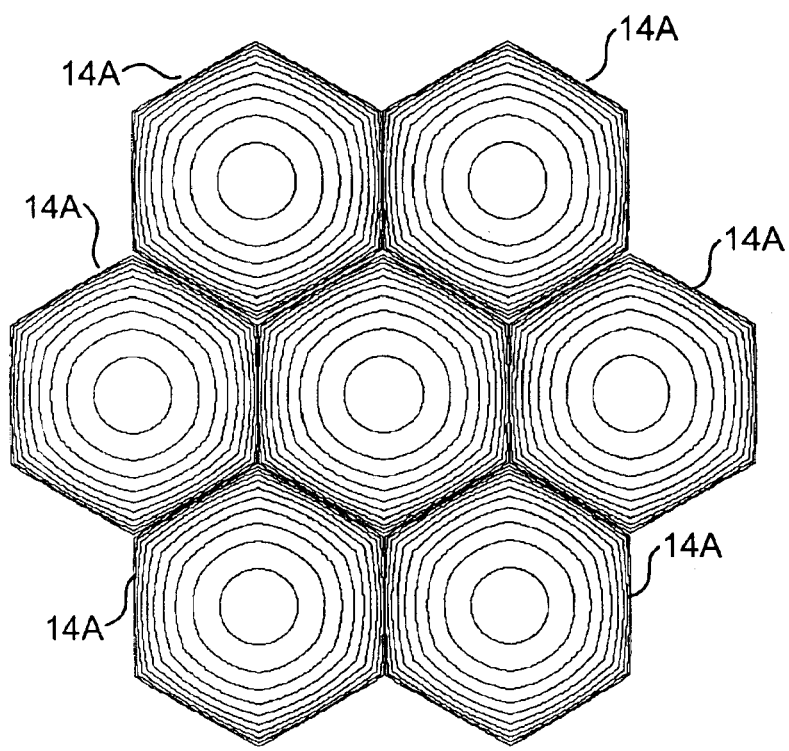

FIG. 6B depicts alternative "approximately hemispherical", inwardly convex "hemi-beads" 14A which are substantially hexagonal in an outwardmost cross-sectional region parallel to the macroscopic plane of display 10's viewing surface 17 (FIG. 1A), allowing hemi-beads 14A to be packed closely together with no gaps, or minimal gaps, between adjacent ones of hemi-beads 14A. The inwardmost regions of hemi-beads 14A, ("inward" again being the side of hemi-beads 14A which protrudes into medium 20) are semi-spherical, as indicated by the innermost circular topographic lines on hemi-beads 14A. Between their semi-spherical inwardmost regions and their hexagonal outwardmost regions, the shape of each bead hemi-14A varies from semi-spherical to hexagonal, as indicated by the intermediate topographic lines on hemi-beads 14A. The closer a particular region of hemi-bead 14A is to the inwardmost semi-spherical region, the more spherical that particular region's shape is. Conversely, the closer a particular region of hemi-bead 14A is to the outwardmost hexagonal region, the more hexagonal that particular region's shape is.

Although hemi-beads 14A may have a slightly reduced reflectance and may exhibit slightly poorer semi-retro-reflection characteristics, this may be more than offset by the absence of gaps. Hemi-beads 14A may have many other alternative irregular shapes yet still achieve acceptably high apparent brightness throughout acceptably wide angular viewing ranges. Useful shapes include those which are approximately hemispherical ("hemi-beads"), in the sense that such a shape's surface normal at any point differs in direction from that of a similarly sized "perfect" hemisphere by an error angle ε which is small. This is illustrated in FIGS. 7A and 7B.

The solid line portion of FIG. 7A depicts a shape 88 which is not "approximately hemispherical", even though it closely matches the dimensions of a substantially identically-sized notionally "perfect" hemisphere 90 shown in dashed outline and superimposed on shape 88. Shape 88 has a surface normal 92 at a selected point 94 on shape 88. Hemisphere 90 has a surface normal 96 (i.e. radius) at notional point 98, which is the closest point on hemisphere 90 to selected point 94 (in this example, points 94, 98 happen to coincide at a point where shape 88 intersects hemisphere 90). Surface normals 92, 96 differ in direction by a relatively substantial error angle $\epsilon_1$. By contrast, the solid line portion of FIG. 7B depicts a hemi-bead 98 which is "approximately hemispherical". Hemi-bead 98 has a surface normal 100 at a selected point 102 on hemi-bead 98. The dashed line portion of FIG. 7B depicts a notional "perfect" hemisphere 104 having a size substantially identical to and superimposed on hemi-bead 98. Hemisphere 104 has a surface normal 106 (i.e. radius) at notional point 108, which is the closest point on hemisphere 104 to selected point 102. Surface normals 100, 106 differ in direction by a relatively insubstantial error angle $\epsilon_2$ which is preferably less than 10° and ideally substantially less than 10°.

As previously mentioned, instead of partially embedding spherical (or approximately spherical) beads in a material, one may instead form hemispherical (or approximately hemispherical) beads on a substrate to provide a composite sheet bearing a plurality of inwardly convex protrusions with no gaps, or minimal gaps, between adjacent protrusions and having sufficient approximate sphericity to achieve high apparent brightness through a wide angular viewing range. Specifically, high refractive index hemispherical (or approximately hemispherical) beads may be affixed to a low refractive index transparent substrate (i.e. $\eta_1 \gg \eta_2$, for example $\eta_1 \approx 1.92$ and $\eta_2 \approx 1.59$) to provide a high apparent brightness, wide angular viewing range display in accordance with the invention. Fabrication of such a display is illustrated in FIGS. 8A–8F.

Figure 8A:
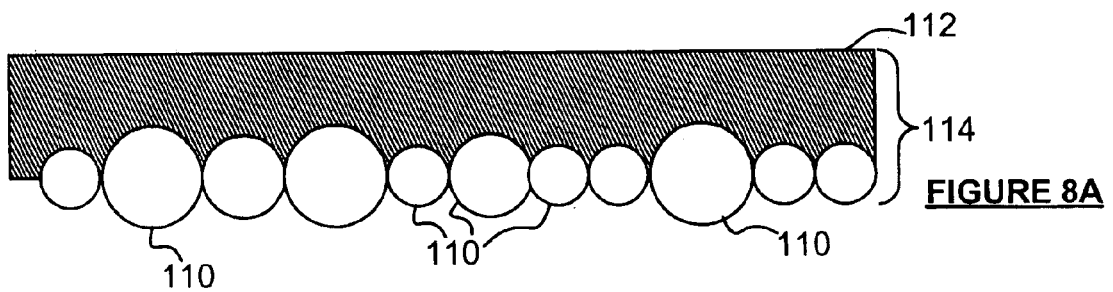
FIGS. 8A through 8F are cross-sectional views, on a greatly enlarged scale, depicting fabrication of high refractive index hemispherical structures on a transparent substrate of arbitrarily low refractive index.

As shown in FIG. 8A, a large number of the aforementioned high refractive index T-4 Sign Beads 110 of varying sizes (as supplied by the manufacturer) are pressed into the surface of an adhesive elastomeric substrate 112, producing a beaded structure 114. A predetermined uniform pressure suffices to embed one-half of a sphere in an elastomer, independently of the sphere's size. Accordingly, application of a predetermined uniform pressure embeds one-half of most of spheres 110 in substrate 112, as shown in FIG. 8A. Provision of spheres 110 in varying sizes is advantageous, in that a greater net coverage area can be attained than with spheres of identical size.

Figure 8B:
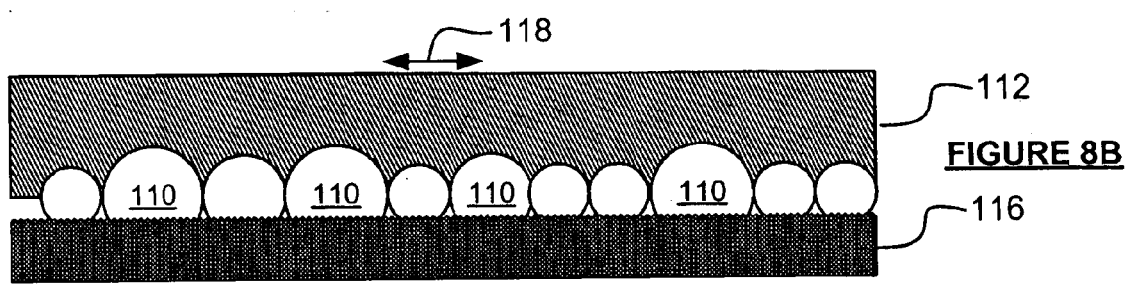
Figure 8C:
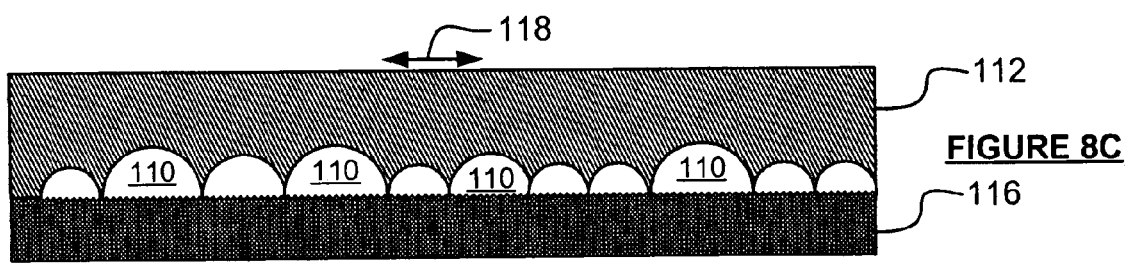
Figure 8D:
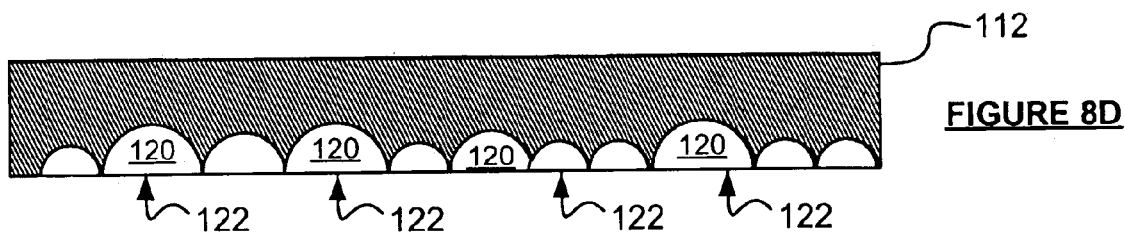
Figure 8E:
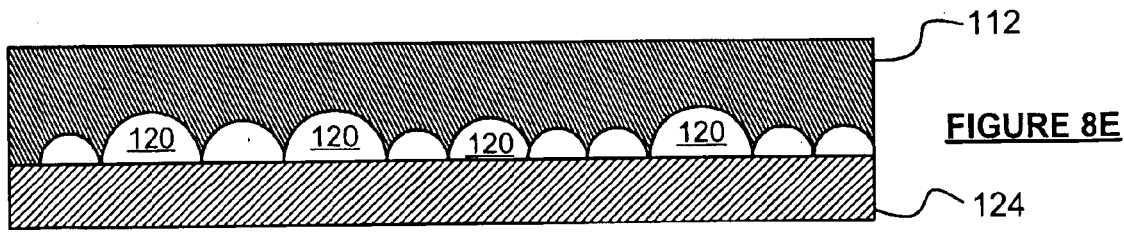
Figure 8F:
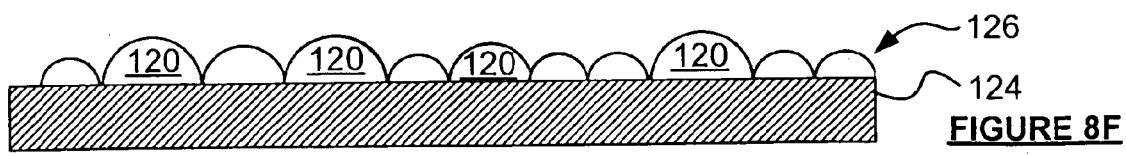

Next, as shown in FIG. 8B, beaded structure 114 is pressed onto and reciprocated against flat optical polishing surface 116 (for example 1 micron diamond grit embedded in brass) as indicated by double-headed arrow 118 (FIGS. 8B and 8C), until spheres 110 are abraded to the point that only hemispheres 120 remain embedded in elastomeric substrate 112, with polished, substantially flat, substantially coplanar circular faces 122 exposed (FIG. 8D). Faces 122 are then adhered (for example, using a spin-coated ultraviolet cured epoxy) to a transparent flat substrate 124 such as polycarbonate ($\eta \sim 1.59$) (FIG. 8E), and elastomeric substrate 112 is removed, for example by means of a suitable solvent, yielding the desired hemi-beaded structure 126 (FIG. 8F) consisting of high refractive index hemispherical (or approximately hemispherical) beads 120 on transparent substrate 124. Structure 126 can then be indium-tin-oxide (ITO) coated to produce a transparent electrode on beads 120, as previously mentioned. Alternatively, spheres 110 can be ITO-coated before they are pressed into substrate 112, then hemispheres 120 can be electrically connected to one another by depositing, around their bases a thin conductive coating such as Bayer Baytron™ conductive polymer.

High apparent brightness, wide angular viewing range displays can also be produced in accordance with the invention by selectably frustrating TIR in alternative ways. For example, instead of suspending absorptive particles 26 in electrophoresis medium 20, one could suspend an electrode-bearing membrane in the medium as disclosed in WO01/37627 which is incorporated herein by reference. TIR can also be selectably frustrated without using electrophoresis and without providing any liquid adjacent the "hemi-beaded" TIR interface. For example, as disclosed in U.S. Pat. Nos. 5,959,777; 5,999,307; and 6,088,013 (all of which are incorporated herein by reference) a member can be controllably deformed or positioned by hydraulic, pneumatic, electronic, electrostatic, magnetic, magnetostrictive, piezoelectric, etc. means such that the member either is or is not in optical contact with a selected "pixel" portion of the hemi-beaded TIR interface.

What is claimed is:

1. A reflective display, comprising:
   (a) a plurality of transparent hemi-beads substantially covering and protruding inwardly from an inward surface of a transparent sheet;
   (b) means for selectably moving a member into an intense evanescent wave region at an inward side of the hemi-beads to selectably frustrate substantial total internal reflection of light rays at the inward side;
   wherein:
   (c) outwardmost regions of the hemi-beads are substantially hexagonal;
   (d) inwardmost regions of the hemi-beads are approximately spherical;
   (e) first intermediate regions of the hemi-beads close to the outwardmost region are more approximately hexagonal than second intermediate regions of the hemi-beads which are farther from the outwardmost region than the first intermediate regions; and
   (f) third intermediate regions of the hemi-beads close to the inwardmost region are more approximately spherical than a fourth intermediate region of the hemi-beads which is farther from the inwardmost region than the third intermediate regions.

2. A reflective display as defined in claim 1, wherein:
   (a) the hemi-beads have a refractive index $\eta_1$; and
   (b) the transparent sheet has a refractive index $\eta_2$ and has an outward viewing surface.

3. A reflective display as defined in claim 1, the transparent sheet further comprising a nano-composite structure of high refractive index particles suspended in a polymer.

4. A display as defined in claim 1, wherein a first surface normal at substantially any selected point on substantially any selected one of the hemi-beads differs in direction by an angle $\epsilon$ from a second surface normal at a notional point on a notional perfect hemisphere superimposed on the selected one of the hemi-beads, the notional perfect hemisphere and the selected one of the hemi-beads having a substantially equal size, the notional point being the point on the notional perfect hemisphere which is closest to the selected point, and wherein e is less than a predefined value.

5. A display as defined in claim 1, wherein the hemi-beads are approximately hemispherical portions of approximately spherical members partially embedded in the transparent sheet.

6. A display as defined in claim 1, wherein the hemi-beads are approximately hemispherical members affixed to the inward surface of the transparent sheet.

7. A display as defined in claim 2, wherein $\eta_1 \approx \eta_2$.

8. A display as defined in claim 1, wherein the hemi-beads are shaped to minimize gaps between outwardmost portions of adjacent ones of the hemi-beads.

9. A display as defined in claim 1, wherein:
   (i) the transparent sheet further comprises a nano-composite structure of high refractive index particles suspended in a polymer; and
   (ii) the hemi-beads are shaped to minimize gaps between outwardmost portions of adjacent ones of the hemi-beads.

* * * * *